(12) United States Patent
Hwang

(10) Patent No.: US 12,423,088 B1
(45) Date of Patent: Sep. 23, 2025

(54) METHOD AND SYSTEM FOR MANAGING ARTIFICIAL INTELLIGENCE MODEL INSTALLED AND OPERATING IN TERMINAL ENVIRONMENT

(71) Applicant: Piamond Corp., Busan (KR)

(72) Inventor: Doo Geon Hwang, Busan (KR)

(73) Assignee: PIAMOND CORP., Busan (KR)

( * ) Notice: Subject to any disclaimer, the term of this patent is extended or adjusted under 35 U.S.C. 154(b) by 0 days.

(21) Appl. No.: 18/760,590

(22) Filed: Jul. 1, 2024

(51) Int. Cl.
*G06F 8/65* (2018.01)
*G06F 8/61* (2018.01)

(52) U.S. Cl.
CPC . *G06F 8/65* (2013.01); *G06F 8/61* (2013.01)

(58) Field of Classification Search
USPC .......................................................... 717/168
See application file for complete search history.

(56) References Cited

U.S. PATENT DOCUMENTS

| | | | |
|---|---|---|---|
| 2017/0213155 A1* | 7/2017 | Hammond | G06F 8/31 |
| 2020/0026977 A1* | 1/2020 | Lee | G06N 3/02 |
| 2021/0318861 A1* | 10/2021 | Ashirvad | G06F 8/61 |
| 2022/0027791 A1* | 1/2022 | Song | G06N 3/045 |
| 2022/0036152 A1* | 2/2022 | Yeo | G06N 3/0495 |
| 2022/0147844 A1* | 5/2022 | Lee | G06N 5/04 |
| 2024/0201957 A1* | 6/2024 | Chaurasia | G06F 8/36 |
| 2024/0223652 A1* | 7/2024 | Sun | G06F 8/71 |
| 2024/0264723 A1* | 8/2024 | Davidson | G06F 9/451 |

OTHER PUBLICATIONS

Thasmika Gokal; "Introducing Meta Llama 3 Models on Azure AI Model Catalog"; Microsoft Techcommunity Machine Learning blog page (techcommunity.microsoft.com) [full URL included in ref.]; Apr. 18, 2024 (Year: 2024).*
Clayton et al.; "Streamline Development of AI-Powered Apps with Nvidia RTX AI Toolkit for Windows RTX PCs"; Nvidia.com Developer Blog [Full URL included in ref.]; Jun. 2, 2024 (Year: 2024).*

* cited by examiner

*Primary Examiner* — Bradley A Teets
*Assistant Examiner* — Clint Thatcher
(74) *Attorney, Agent, or Firm* — Perilla Knox & Hildebrandt LLP; Thomas B. Hildebrandt

(57) ABSTRACT

Method and system for managing artificial intelligence model installed and operating in terminal environment are disclosed. A method for managing an artificial intelligence model according to one embodiment may include storing and updating device information of each of a plurality of user terminals that download and install an artificial intelligence model from an artificial intelligence model store, and determining whether or not a first artificial intelligence model can be installed on a first user terminal based on device information of a first user terminal according to an installation request for the first artificial intelligence model of the first user terminal among the plurality of user terminals.

20 Claims, 13 Drawing Sheets

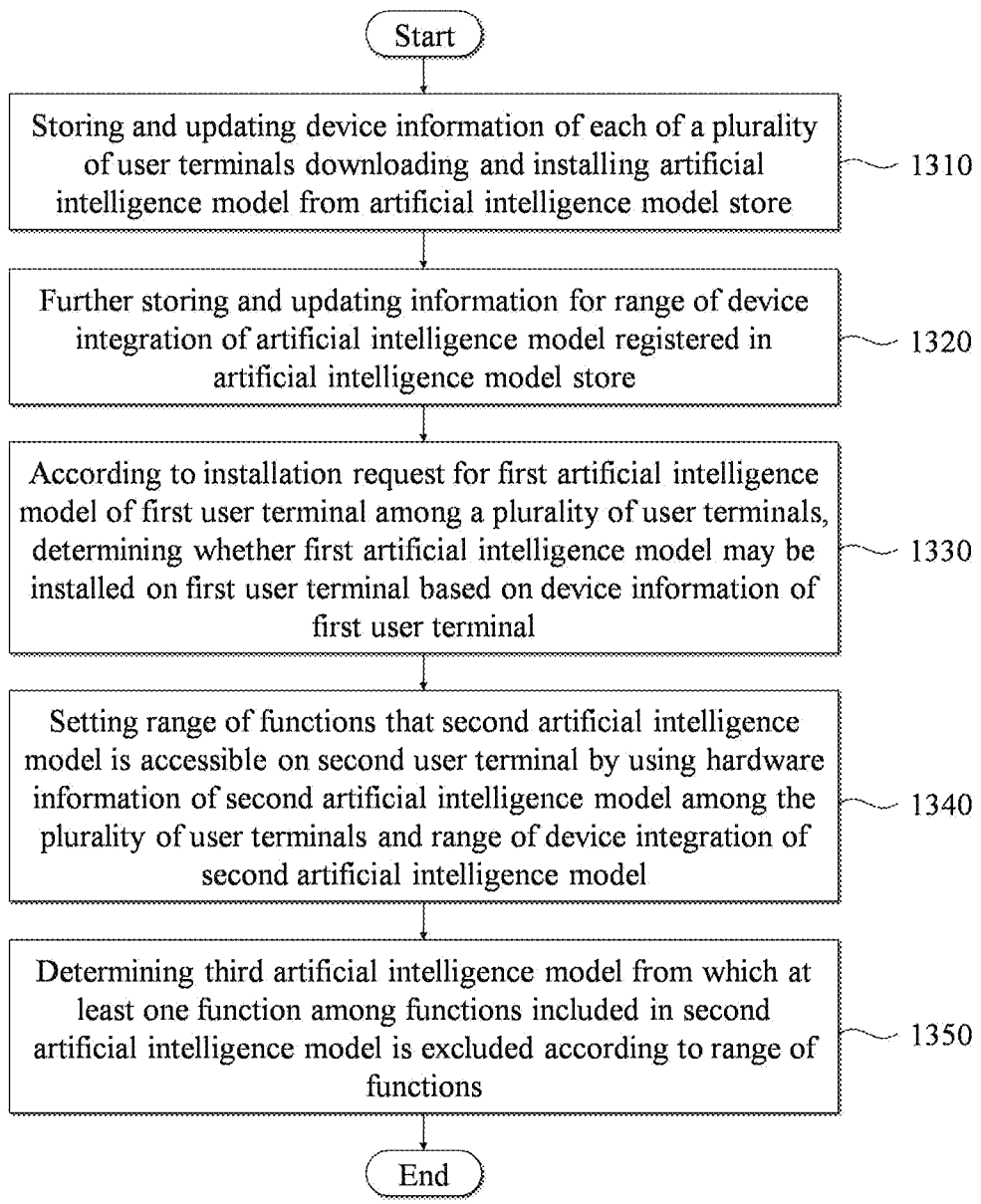

METHOD AND SYSTEM FOR MANAGING ARTIFICIAL INTELLIGENCE MODEL INSTALLED AND OPERATING IN TERMINAL ENVIRONMENT

CROSS-REFERENCE TO RELATED APPLICATION

This application claims the benefit of priority under 35 U.S.C. § 119 to Korean Patent Application No. 10-2023-0092220 filed on Jul. 17, 2023, Korean Patent Application No. 10-2024-0078217 filed on Jun. 17, 2024, and Korean Patent Application No. 10-2024-0078218 filed on Jun. 17, 2024, in the Korean Intellectual Property Office (KIPO), the entire contents of which are incorporated herein by reference.

BACKGROUND

1. Field

The following description relates to a method and system for managing artificial intelligence model installed and operating in a terminal environment.

2. Description of Related Art

AI (Artificial Intelligence) models are rapidly developing, and it is anticipated that new expert models with high performance will emerge through sophisticated training of LLMs (Large Language Models), even with the use of smaller hyperparameters. Also, existing user terminal environments cannot be equipped with the LLMs, but it is expected that in the future, a larger AI model will be able to run due to installation of terminal memory and inference-specific chips. In addition, by utilizing AI models trained to and specialized in specific domains like MOE (Mixture of Expert), approaches such as loading and using small models providing excellent inference performance as needed may be implemented.

Meanwhile, mobile terminals or AR (Augmented Reality), VR (Virtual Reality), XR (extended Reality) devices, which are interfaces where users meet the cyber world, can be points where users' information can be most easily obtained. In the future, it is expected that on-device AI agents capable of leaning user's behavior on the terminal and processing the user's behavior on behalf of the user will be equipped on the user terminal. In this case, it is expected that AI models will replace various service responses and two-way interactions used in mobile environment. For example, through the AI models, the terminal may determine whether a user has woken up and control whether the alarm rings and its sound, summarize the previous day's stock market information and provide it, summarize key contents of emails, remind important tasks on a to do list or schedule, and provide information on delivery status of purchased items or items to be received that day, and the AI models may take over the user's behaviors in tasks performed through interactions between the user and the terminal.

Such AI models for terminal operation have distinction with AI models on external networks. In case of AI models operating on external networks, there are limitations to individual usability due to issues such as exporting user data to outside. Particularly, it is not free from privacy exposure, uses external network resources every time, and may cause network delays in response. In contrast, in case of lightweight AI models that may run on a terminal, it has a characteristic of being able to run desired AI functions directly on the terminal in proportion to the model size according to performance of a system.

SUMMARY

Embodiments provide a method and system for managing artificial intelligence model installed and operating in a terminal environment.

Embodiments provide a method and system for managing artificial intelligence model in a terminal environment for operation of artificial intelligence model.

A method for managing an artificial intelligence model of a computer device comprising at least one processor includes storing and updating device information of each of a plurality of user terminals that download and install an artificial intelligence model from an artificial intelligence model store, by the at least one processor; and determining whether or not a first artificial intelligence model can be installed on a first user terminal based on device information of a first user terminal according to an installation request for the first artificial intelligence model of the first user terminal among the plurality of user terminals, by the at least one processor.

According to an aspect, the device information may include at least one of information for version of operating system on a user terminal, and security framework of an application that calls an artificial intelligence model.

According to another aspect, the device information may further include hardware information of a user terminal, and the method may further include further storing and updating information for a range of device integration of an artificial intelligence model registered in the artificial intelligence model store, by the at least one processor; and setting a range of functions accessible to a second user terminal by a second artificial intelligence model by using hardware information of the second user terminal among the plurality of user terminals and a range of device integration of the second artificial intelligence model, by the at least one processor.

According to another aspect, the method for managing an artificial intelligence model may further include determining a third artificial intelligence model from which at least one function among functions included in the second artificial intelligence model is excluded according to the range of functions, by the at least one processor.

According to another aspect, the second artificial intelligence model may include an artificial intelligence model requested to be installed on the second user terminal, and the third artificial intelligence model may be recommended to the second user terminal instead of the second artificial intelligence model.

According to another aspect, information for the range of device integration may include at least one of information on sensors that the artificial intelligence model can integrate with among predefined sensors, size of memory or storage space available to the artificial intelligence model, and update cycle of the artificial intelligence model.

According to another aspect, the method for managing an artificial intelligence model may further include managing update schedule for an artificial intelligence model installed on each of the plurality of user terminals by using the information for the range of device integration, by the at least one processor.

According to another aspect, the method for managing an artificial intelligence model may further include further storing and updating version information of the artificial intelligence model installed on each of the plurality of user terminals, by the at least one processor.

According to another aspect, the method for managing an artificial intelligence model may further include further storing and updating operation information of the artificial intelligence model installed and run on each of the plurality of user terminals, by the at least one processor.

According to another aspect, the operation information may include at least one of information on whether the artificial intelligence model installed and run on each of the plurality of user terminals communicated with external services of the user terminals, and information on whether the artificial intelligence model installed and run on each of the plurality of user terminals was updated itself on the corresponding user terminal.

A method for managing an artificial intelligence model of a computer device comprising at least one processor includes selecting an artificial intelligence model among a plurality of artificial intelligence models registered in an artificial intelligence model store, by the at least one processor; acquiring information for features and functions of the selected artificial intelligence model through the artificial intelligence model store and providing it to a user, by the at least one processor; downloading and verifying the selected artificial intelligence model through the artificial intelligence model store according to the user's request, by the at least one processor; and providing a function for setting at least two or more of a data access range, a real-time input integration range, an external communication range, and operation cycle of the verified artificial intelligence model through the user, by the at least one processor.

According to an aspect, the function for setting the data access range may include a function for setting at least one of (1) format of data accessible by the verified artificial intelligence model, (2) an application that can be called by the verified artificial intelligence model among external applications installed on the computer device, and (3) data accessible by the artificial intelligence model among data stored on the computer device.

According to another aspect, the function for setting the real-time input integration range may include a function for setting a callable form that can be activated in relation to the verified artificial intelligence model among a plurality of preset callable forms.

According to another aspect, the plurality of callable forms comprise two or more of (1) a form in which the verified artificial intelligence model is called through a user interface provided by the computer device, (2) a form in which the verified artificial intelligence model waits for the user's command, and (3) a form in which the verified artificial intelligence model is called through another artificial intelligence model or an application installed on the computer device.

According to another aspect, the function for setting the external communication range may include a function for setting whether the verified artificial intelligence model can communicate externally.

According to another aspect, the function for setting the operation cycle may include a function for setting cycle or method in which the verified artificial intelligence model operates in response to the user's input.

According to another aspect, the method in which the verified artificial intelligence model operates in response to the user's input may include at least a method in which the verified artificial intelligence model is triggered itself.

According to another aspect, the at least one processor may include an encryption processor implemented as hardware or firmware that provides an encryption function, and the downloading and verifying may encrypt at least part of the selected artificial intelligence model through an encrypted channel set between the encryption processor and secured memory further included on the computer device, and transmit it to storage space of the secured memory.

According to another aspect, the secured memory may include artificial intelligence model storage for storing an artificial intelligence model and metadata related to an artificial intelligence model, and artificial intelligence data storage for storing data collected and generated through an artificial intelligence model installed on the computer device.

According to another aspect, the artificial intelligence data storage may include a vector storing function for storing vector data embedded through an artificial intelligence model.

A non-transitory computer-readable recording medium storing program instructions to execute the method in a computer device is provided.

A computer device includes at least one processor implemented to execute instructions readable on the computer device, and the computer device, by the at least one processor, stores and updates device information of each of a plurality of user terminals that download and install an artificial intelligence model from an artificial intelligence model store, and determines whether or not a first artificial intelligence model can be installed on a first user terminal based on device information of the first user terminal according to an installation request for the first artificial intelligence model of the first user terminal among the plurality of user terminals.

A computer device includes at least one processor implemented to execute instructions readable on the computer device, and the computer device, by the at least one processor, selects an artificial intelligence model among a plurality of artificial intelligence models registered in an artificial intelligence model store, acquires information for features and functions of the selected artificial intelligence model through the artificial intelligence model store and provides it to a user, downloads and verifies the selected artificial intelligence model through the artificial intelligence model store according to the user's request, and provides a function for setting at least two or more of a data access range, a real-time input integration range, an external communication range, and operation cycle of the verified artificial intelligence model through the user.

BRIEF DESCRIPTION OF THE DRAWINGS

FIG. 13 is a flowchart illustrating an example of a method for managing an artificial intelligence model according to an embodiment.

DETAILED DESCRIPTION

Hereinafter, embodiments will be described with reference to the accompanying drawings.

A system for managing an artificial intelligence model according to embodiments of the present disclosure may be implemented by at least one computer device. At this time, in a computer device, a computer program according to one embodiment of the present disclosure may be installed and run, and the computer device may perform a method for managing a user artificial intelligence model according to embodiments of the present disclosure according to control of the run computer program. The aforementioned computer program may be stored in a computer-readable recording medium to execute the method for managing an artificial intelligence model in conjunction with the computer device.

Figure 1:
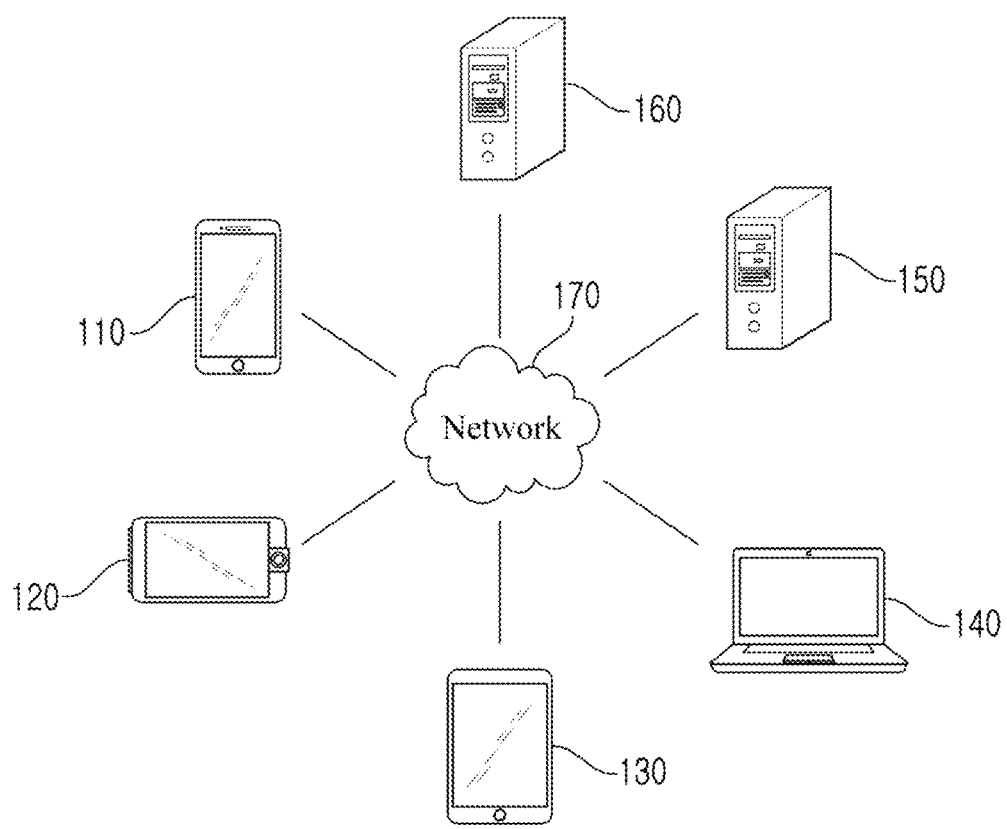
FIG. 1 is a drawing illustrating an example of a network environment according to an embodiment.

FIG. 1 is a drawing illustrating an example of a network environment according to an embodiment. The network environment of FIG. 1 indicates an example including a plurality of electronic devices 110, 120, 130, and 140, a plurality of servers 150 and 160, and a network 170. Such FIG. 1 is provided as an example only and the number of electronic devices or the servers is not limited thereto.

The plurality of electronic devices 110, 120, 130, and 140 may be stationary terminals or mobile terminals implemented with a computer system. As examples of the plurality of electronic devices 110, 120, 130, and 140, there are a smartphone, a mobile phone, a navigation device, a computer, a laptop computer, a terminal for digital broadcasting, PDA (personal digital assistants), a PMP (portable multimedia player), a tablet PC, a game console, a wearable device, an IoT (Internet of Things) device, a VR (virtual reality) device, an AR (Augmented reality) device, etc. As an example, in FIG. 1, a shape of a smartphone is illustrated as an example of the electronic device 110, but in the embodiments of the present disclosure, the electronic device 110 may mean one of various physical computer systems capable of communicating with other electronic devices 120, 130, and 140 and/or the servers 150 and 160 through the network 170 by substantially using wireless or wired communication method.

A communication method is not limited, and may include short-distance wireless communication between devices in addition to communication methods using communication networks (e.g., a mobile communication network, wired Internet, wireless Internet, a broadcasting network, a satellite network, and the like) which may be included in the network 170. For example, the network 170 may include one or more any networks of a PAN (personal area network), a LAN (local area network), a CAN (campus area network), a MAN (metropolitan area network), a WAN (wide area network), a BBN (broadband network), and the Internet. Furthermore, the network 170 may include any one or more of network topologies, including a bus network, a star network, a ring network, a mesh network, a star-bus network, and a tree or hierarchical network, but is not limited thereto.

Each of the servers 150 and 160 may be implemented with a computer device or a plurality of computer devices for providing instructions, code, files, contents, or services by communicating with the plurality of electronic devices 110, 120, 130, and 140 through the network 170. For example, the server 150 may be a system that provides a first service to the plurality of electronic devices 110, 120, 130, and 140 connected through the network 170, and the server 160 also may be a system that provides a second service to the plurality of electronic devices 110, 120, 130, and 140 connected through the network 170. As more particular example, through an application as a computer program installed and operated on the plurality of electronic devices 110, 120, 130, and 140, the server 150 may provide a service targeted by the corresponding application (e.g., search service and the like) as the first service to the plurality of electronic devices 110, 120, 130, and 140. As another example, the server 160 may provide a service for distributing a file for installation and operation of above described application to the plurality of electronic devices 110, 120, 130, and 140 as the second service.

Figure 2:
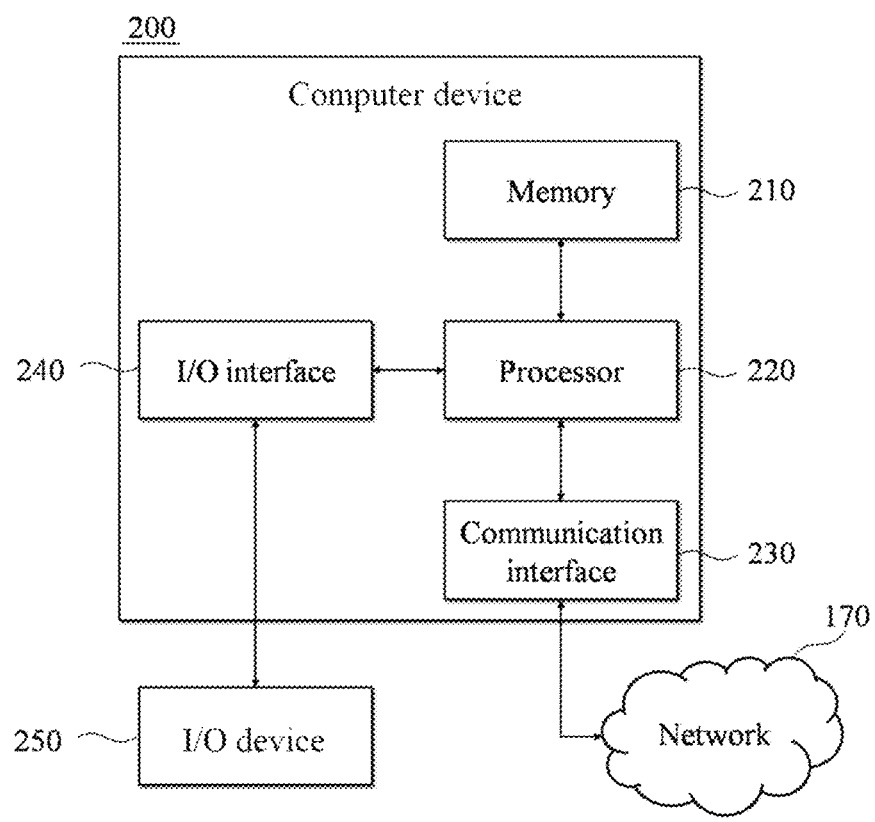
FIG. 2 is a block diagram illustrating an example of a computer device according to an embodiment.

FIG. 2 is a block diagram illustrating an example of a computer device according to an embodiment. Each of the plurality of electronic devices 110, 120, 130, and 140 or each of the servers 150 and 160 described above may be implemented by a computer device 200 of FIG. 2.

As illustrated in FIG. 2, such computer device 200 may include a memory 210, a processor 220, a communication interface 230, and an input/output (I/O) interface 240. The memory 210 is a computer-readable recording medium, and may include permanent mass storage devices, such as a RAM (random access memory), a ROM (read only memory) and a disk drive. Here, the permanent mass storage device, such as a ROM and a disk drive, may be included in the computer device 200 as a permanent storage device separated from the memory 210. Furthermore, an operating system and at least one program code may be stored in the memory 210. Such software components may be loaded from a computer-readable recording medium separated from the memory 210 to the memory 210. Such a separate computer-readable recording medium may include computer-readable recording media, such as a floppy drive, a disk, a tape, a DVD/CD-ROM drive, a memory card, and the like. In another embodiment, software components may be loaded onto the memory 210 through the communication interface 230, not a computer-readable recording medium. For example, the software components may be loaded onto the memory 210 of the computer device 200 based on a computer program installed by files received through the network 170.

The processor 220 may be configured to process instructions of a computer program by performing basic arithmetic, logic and I/O operations. The instructions may be provided to the processor 220 by the memory 210 or the communication interface 230. For example, the processor 220 may be configured to execute instructions received according to program code stored in a recording device, such as the memory 210.

The communication interface 230 may provide a function for enabling the computer device 200 to communicate with other devices (e.g. above described storing devices) through the network 170. For example, a request, an instruction, data or a file generated by the processor 220 of the computer device 200 according to program code stored in a recording device such as the memory 210 may be transmitted to other devices through the network 170 according to control of the communication interface 230. Inversely, a signal, an instruction, data or a file from another device may be received to the computer device 200 through the communication interface 230 of the computer device 200 passing through the network 170. A signal, an instruction or data and the like received through the communication interface 230 may be transmitted to the processor 220 or the memory 210, and a file may be stored in a storage medium (above described permanent storage device) which may be further included in the computer device 200.

The I/O interface 240 may be means for interface with an input/output (I/O) device 250. For example, the input device may include a device such as a microphone, a keyboard or a mouse and the like, and the output device may include a device such as a display or a speaker. For another example, the I/O interface 240 may be means for interface with a device in which functions for input and output have been integrated into one, such as a touch screen. The I/O devices 250, together with the computer device 200, may be configured as a single device.

Furthermore, in other embodiments, the computer device 200 may include components less or more than the components of FIG. 2. However, it is not necessary to clearly illustrate most of conventional components. For example, the computer device 200 may be implemented to include at least some of the I/O device 250 above described or may further include other components such as a transceiver, a database, etc.

In case of an AI (Artificial Intelligence) model operating in a terminal environment, since it may directly access to user data, a separate secure data access and utilization management model must be presented. For example, a separate AI model store for supplying AI models that users can use safely may be required. Such AI model store should be able to evaluate and manage stability and/or functionality of individual AI models. Users can install AI models with verified stability on their terminals according to their choice and grant access to the information they desire.

Figure 3:
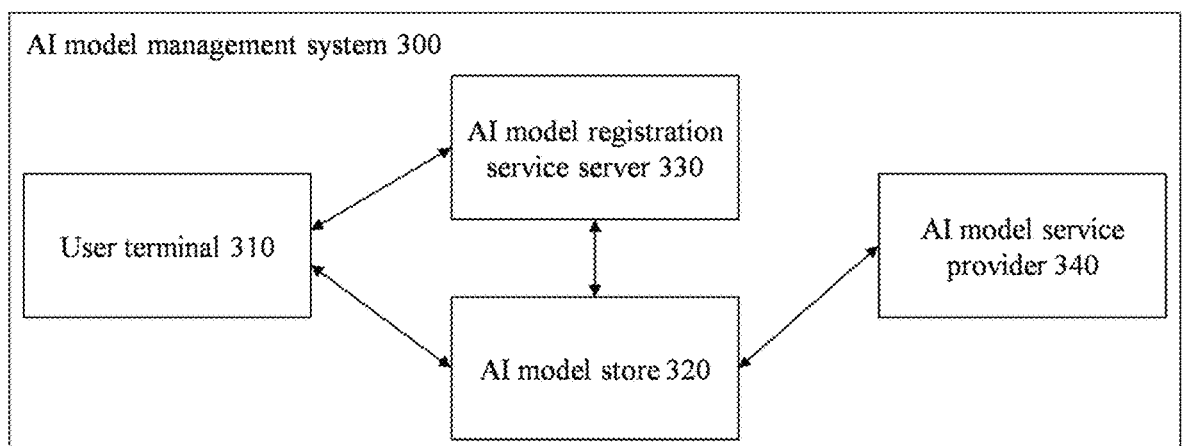
FIG. 3 is a drawing illustrating an example of a schematic view of a system for managing an AI model according to an embodiment.

FIG. 3 is a drawing illustrating an example of a schematic view of a system for managing an AI model according to an embodiment. A system for managing an AI model 300 according to an embodiment of FIG. 3 represents a user terminal 310, an AI model store 320, an AI model registration service server 330, and an AI model service provider 340. For an AI model to be provided to the user terminal 310 in the embodiment, the AI model store 320 may register the AI model through a pre-verification procedure for the AI model that the AI model service provider 330 provides, and may distribute the AI model to the user terminal 310 according to the user terminal 310's request. Such AI model store 320 may provide a function for verifying and examining the AI model to be register in advance, a function for managing external data linkage information of the AI model, a function for managing AI model version and integrity, and the like. At this time, the AI model registration service server 330 may separately manage information related to the AI model that may be operated on the user terminal 310.

Each of the user terminal 310, the AI model store 320, the AI model registration service server 330, and the AI model service provider 340 may be implemented through above described computer device 200, and may communicate with each other through the network 170.

In addition, in the embodiment of FIG. 3, one user terminal 310 and one AI model service provider 340 are presented, but it is easy to understand that there may be multiple user terminals and multiple AI model service providers.

Figure 4:
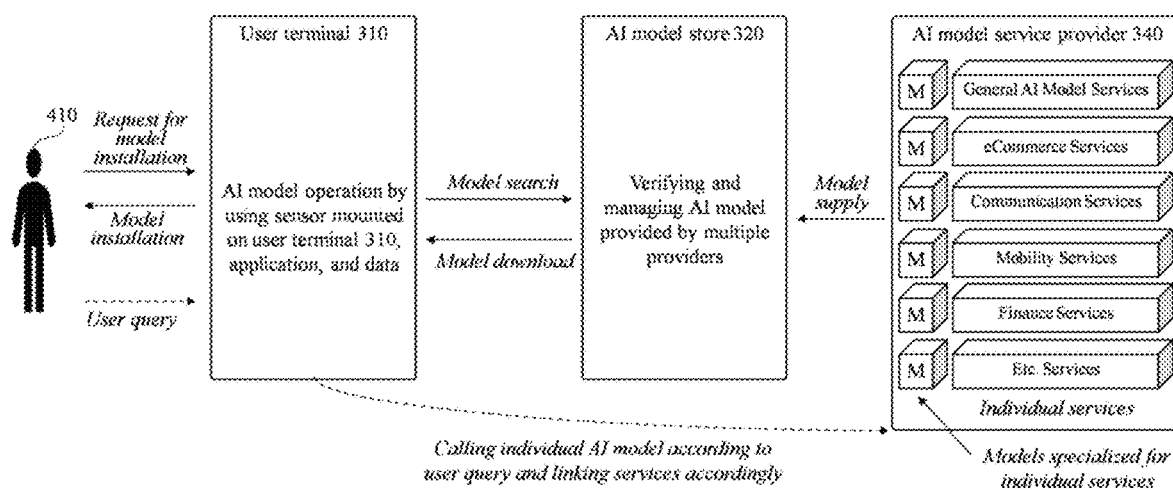
FIG. 4 is a drawing illustrating an example of a process for managing an AI model according to an embodiment.

FIG. 4 is a drawing illustrating an example of a process for managing an AI model according to an embodiment. A user 410 may select an AI model that the user 410 desires by accessing the AI model store 320 by using the user terminal 310, and the user terminal 310 may download the AI model selected by the use 410 from the AI model store 320 and install (or load) the AI model on the user terminal 310, and may execute the installed AI model.

Meanwhile, existing service providers, platform suppliers, and/or AI specialized companies may develop AI models specialized in their respective functions and services, and may seek to load these on the user terminal 310. By installing the AI models on the user terminal 310, they aim to maximize the usage of their platforms, services, and/or applications. Each of the service providers, the platform suppliers, and/or the AI specialized companies may operate as the AI model service provider 340, and may register their AI model in the AI model store 320.

Also, the AI model service provider 340 may provide services that an AI model is specialized to the user terminal 310 that installed the AI model through the AI model store 320. For example, according to user queries of the user 410, the user terminal 310 may call an individual AI model, and in conjunction with the called AI model, may receive services that the AI model service provider 340 provides.

Such AI model may operate differently based on the user's authorization setting, and may be triggered in specific situations without direct execution by the user 410. Depending on characteristics of the set authorization, direct integration with external services (integration for messaging, E-commerce, etc.) may be carried out. In addition, the AI model may link with an AI service in a form of voice recognition services that are trusted by the existing device providers (providers of the user terminal 310), and may operate in a form that it processes inputs of the user 410 by using the corresponding AI service.

The user terminal 310 may operate the AI model by using a sensor, an application, and/or data mounted on the user terminal 310. For example, the user terminal 310 may operate the AI model by using sensing information collectable in the user terminal 310, data input/output and generated through an application run on the user terminal 310, and/or data stored in manufacturers and/or providers of the user terminal 310.

In data available to the AI model, personal information of the user 410 may be included. For example, the personal information of the user 410 may include not only information related to personal details of the user 410, but also information for HCI (Human Computer Interaction) or information generated by HCI, and various information such as the user 410's voice, behavior, movement, location, other sensing data, and the like.

The AI model store 320 may process verification and management for AI provided by multiple providers (the AI model service provider 340).

Figure 5:
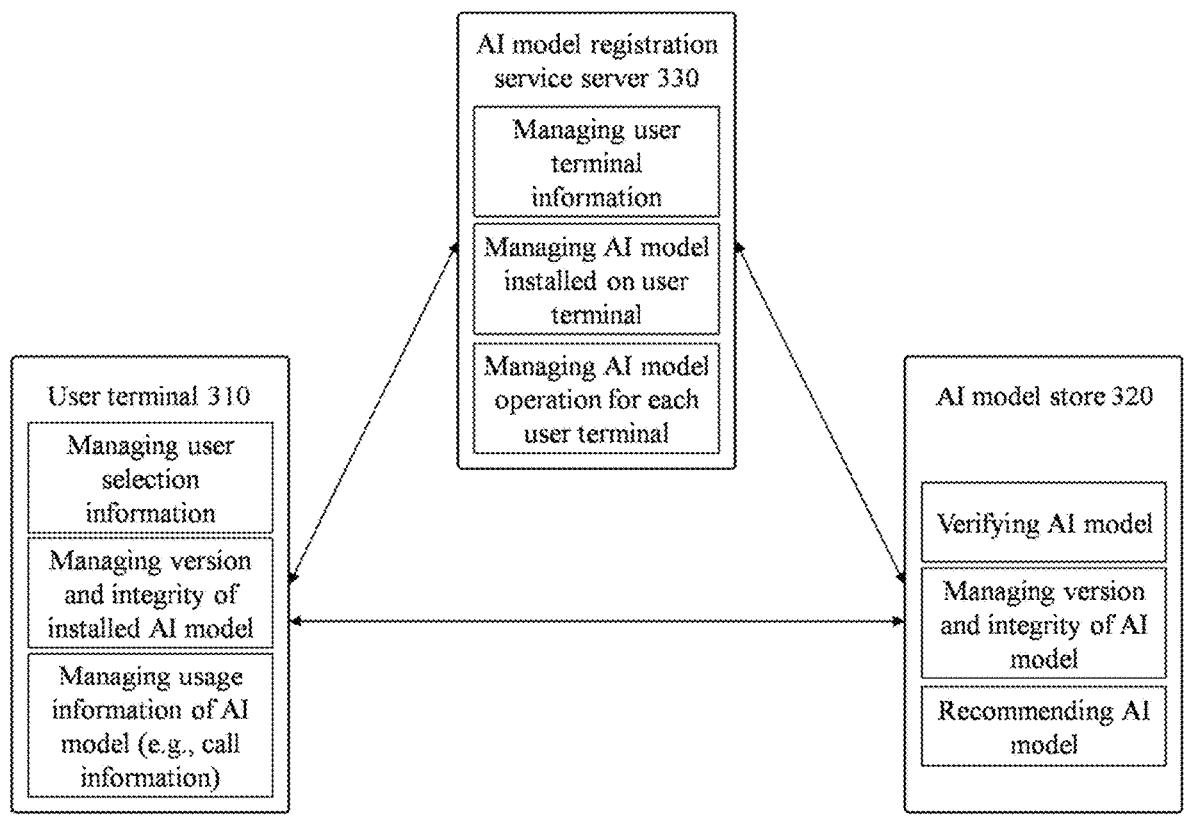
FIG. 5 is a drawing illustrating an example of a structure for supplying and installing an AI model operating in a terminal environment according to an embodiment.

FIG. 5 is a drawing illustrating an example of a structure for supplying and installing an AI model operating in a terminal environment according to an embodiment. FIG. 5 represents the user terminal 310, the AI model store 320, and the AI model registration service server 330.

The user terminal 310 may operate an AI model in local according to preference of the user 410. Such user terminal 310 may support safe AI model operation in a form separated from existing terminal computing resources, and may install and operate the AI model based on selection of the user 410. The user terminal 310 may manage information for the selection of the user 410, and manage version and integrity of the AI model installed on the user terminal 310. In addition, the user terminal 310 may manage usage information of the AI model (e.g., information for AI model call).

The AI model store 320 may provide services for connecting the AI model service provider 340 and the user 410. Users may receive the AI model by using the AI model store 320 certified by the AI model service provider 340 to ensure stability when using the AI model. Also, the AI model service provider 340 may use the AI model store 320 for unified access to multiple users. Such AI model store 320 may verify the AI model registered by the AI model service provider 340, and manage version and integrity of the registered AI model. In addition, AI model store 320 may provide functions and/or services for recommending the AI model to the user terminal 310.

The AI model registration service server 330 may separately manage information related to an AI model that may be operated on the user terminal 310. Such information may include information for AI model version, a range of terminal device integration of the AI model (e.g., information for various sensors that may be integrated), a range of external service integration of the AI model (information for possible API call), the size of available memory or storage space of the AI model, and/or update cycle of the AI model, and the like. Also, the AI model registration service server 330 may manage information for the user terminal 310, manage information for the AI model installed on the user terminal 310, and manage information for operation of the AI model for each terminal.

Figure 6:
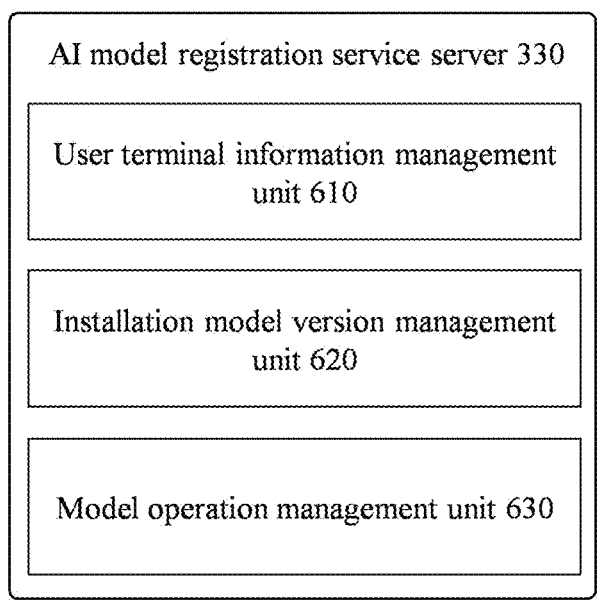
FIG. 6 is a drawing illustrating an example of internal configuration of an AI model registration service server according to an embodiment.

FIG. 6 is a drawing illustrating an example of internal configuration of an AI model registration service server according to an embodiment. The AI model registration service server 330 according to the embodiment may include a user terminal information management unit 610, an installation model version management unit 620, and a model operation management unit 630.

The AI model registration service server 330 may provide a function for managing information of an AI model installed in the AI model store 320, which is linked with the AI model registration service server 330, and the environment of the user terminal 310. Also, the AI model registration service server 330 may manage a function such as download and update for a certified AI model of the AI model store 320 as information for the certified user terminal 310 of the user 410.

The user terminal information management unit 610 may manage device information related to operation of the AI model of the user terminal 310. For example, the user terminal information management unit 610 may store and manage operating system version on the user terminal 310, information for security framework related to the AI model, hardware information of the user terminal 310, and the like as the device information, and based on this, if the user 410 requests installation of a specific AI model in the future, it may determine whether the corresponding AI model may be installed on the user terminal 310. Here, the security framework may include security framework of an application that is installed on the user terminal 310 and calls the corresponding AI model. At this time, the request for installation of the specific AI model of the user 410 may be transmitted to the AI model store 320 through the user terminal 310, and the AI model registration service server 330 linked with the AI model store 320 may receive the installation request and determine whether the AI model may be installed on the user terminal 310 based on the stored information. After this, the AI model registration service server 330 may transmit the information on whether the installation is possible to the user terminal 310 and/or the AI model store 320. Also, the user terminal information management unit 610 may store and manage information for a range of device integration of the AI model (e.g., information for a sensor which may be integrated among various sensors). For example, the user terminal information management unit 610 may define and control a range of functions that a specific AI model may access on the user terminal 310 by using hardware information of the user terminal 310. If a specific AI model has N functions and the user terminal 310 has N−1 functions, the AI model registration service server 330 may reduce operation space of the model on the user terminal 310 by providing a service to the user terminal 310 to select and download another AI model excluding a function that cannot be performed on the user terminal 310 through information managed by the user terminal information management unit 610. For this, the user terminal information management unit 610 may further store and manage information for size of available memory and/or storage space of the AI model, hardware information of the user terminal 310 and/or update cycle of the AI model, and the like. Meanwhile, when there is an update request for the AI model from the AI model store 320, the user terminal information management unit 610 may match it with the information for the user terminal 310 and manage update schedule.

The installation model version management unit 620 may provide a function for managing version of the AI model installed on the user terminal 310 from the AI model registration service server 330. Here, managing version of the AI model may mean storing and updating version of each of AI models installed on the user terminal 310. For example, when an update of a specific AI model occurs, the installation model version management unit 620 may provide a notification for update of the AI model to the user 410 by using the version information of each of AI models installed on the user terminal 310. In case of the AI model installed on the user terminal 310, it may operate in a form of a single AI model or be provided in a method using a separate additional trained layer (e.g., LoRA (Low-Rank Adaption), PEFT (Parameter Efficient Fine-Tuning) or Fine-Tuning (zero-shot, one-shot, few-shot, etc.). Therefore, the update of the AI model occurs according to the specific characteristic. Therefore, in case of the function for managing installation information of the AI model from the perspective of the user terminal 310 and provider of the AI model store 320, the installation model version management unit 620 should be able to separately manage information additionally trained on the user terminal 310 (additionally trained by linking with the user terminal 310 or a specific service) except basic meta information of the AI model. At this time, only in the case that the user 410 wishes to share the corresponding information with the management subject, the installation model version management unit 620 may manage the information.

The model operation management unit 630 may manage information related to operation of an AI model installed and operated on the user terminal 310. Such information related to operation may include information on whether the AI model installed and operated on the user terminal 310 communicates with external services of the user terminal 310, information on whether the AI model is self-updated on the user terminal 310. The model operation management unit 630 may additionally provide a function for managing compatibility with the AI model according to operating system version and feature of the user terminal 310.

Figure 7:
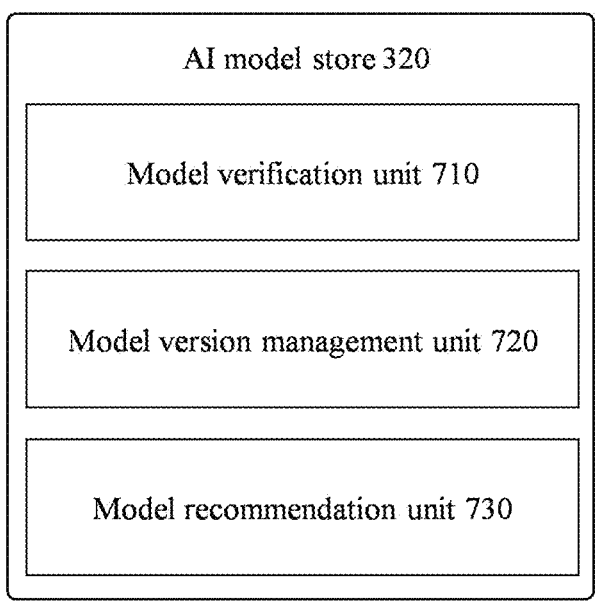
FIG. 7 is a drawing illustrating an example of internal configuration of an AI model store according to an embodiment.

FIG. 7 is a drawing illustrating an example of internal configuration of an AI model store according to an embodiment. The AI model store 320 according to the embodiment may include a model verification unit 710, a model version management unit 720, and a model recommendation unit 730.

The model verification unit 710 may provide a function for managing information of an AI model installed in the AI model store 320 and the environment of the user terminal 310. It may manage certified terminal information of the user 410 and a function for downloading and updating for AI model certified in the AI model store 320.

The model version management unit 720 may manage information related to operation of an AI model on the user terminal 310. For example, the model version management unit 720 may manage information for version of operating system on the user terminal 310, and security framework related to an AI model, and based on this, if the user 410 requests installation of a specific AI model in the future, it may determine whether the corresponding AI model may be installed on the user terminal 310. Also, the model version management unit 720 may manage information for a range of device integration of an AI model (e.g., information for a sensor which may be integrated among various sensors). For example, the model version management unit 720 may define and control a range of functions that a specific AI model may access on the user terminal 310 by using hardware information of the user terminal 310. If a specific AI model has N functions and the user terminal 310 has N−1 functions, the model version management unit 720 may reduce operation space of the model on the user terminal 310 by providing a service to the user terminal 310 to select and download another AI model excluding a function that cannot be performed on the user terminal 310. For this, the user terminal information management unit 610 may store and manage information for size of available memory and/or storage space of the AI model, hardware information of the user terminal 310 and/or update cycle of the AI model, and the like. Meanwhile, when there is an update request for the AI model from the AI model store 320, the model version management unit 720 may match it with the information for the user terminal 310 and manage update schedule.

Since such model version management unit 720 provides similar functions with the above described the user terminal information management unit 610 of the AI model registration service server 330, it may be omitted according to embodiments. For example, the AI model store 320 may provide functions of the model version management unit 720 through the user terminal information management unit 610 by linking with the AI model registration service server 330.

The model recommendation unit 730 may provide a function for recommending an AI model to the user terminal 310. For example, the model recommendation unit 730 may provide a function for classifying multiple AI models registered by the AI model service provider 340, arranging them by each function, and recommending AI models in a user customized manner. Through this, it allows not only for encouraging the user 410 to install multiple AI models by exposing them but also for recommending AI models based on information for mutually compatible AI models based on information of AI model that a specific AI model may be connected (the perspective of enhancing services through linkage between AI models). Such information for mutual calls between AI models may be generated based on external call information provided by the AI model service provider 340 when verifying (or examining) AI models. Or, the AI model service provider 340 may directly provide linkable external model information separately, and the model recommendation unit 730 may generate mutual call information by using information provided by the AI model service provider 340. For example, if a first AI model for search acquires specific information through image search, based on this information, a second AI model for e-commerce services may be called, and in this case, the model recommendation unit 730 may recommend the second AI model to the user terminal 310 using the first AI model.

Figure 8:
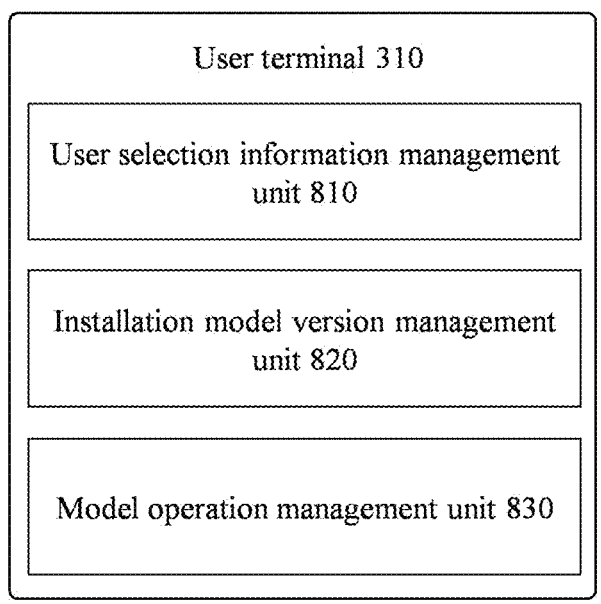
FIG. 8 is a drawing illustrating an example of internal configuration of a user terminal according to an embodiment.

FIG. 8 is a drawing illustrating an example of internal configuration of a user terminal according to an embodiment. The user terminal 310 according to the embodiment may include a user selection information management unit 810, an installation model version management unit 820, and a model operation management unit 830. For example, the user selection information management unit 810, the installation model version management unit 820, and the model operation management unit 830 may be implemented in a form of software modules of applications installed and run on the user terminal 310, in relation to AI model management services.

The user selection information management unit 810 may provide a function for managing information shared or accessible by the user 410 for each AI model installed on the user terminal 310. A function for performing various functions such as a voice recognition process function of operating system of the user terminal 310 may be set by linking with AI agent (e.g., siri, hey google, etc.) on platform of the user terminal 310 itself. In addition, the user selection information management unit 810 may manage whether to allow access to information generated and managed on the user terminal 310 itself (e.g., whether to allow access apps or other computer programs installed on the user terminal 310).

The installation model version management unit 820 may provide a function for managing version of an AI model installed on the user terminal 310. The installation model version management unit 820 may confirm whether a specific AI model is updated by periodically confirming version information of AI models installed on the user terminal 310 with server side (the AI model store 320 and/or the AI model registration service server 330). Also, in case that update of a specific AI model occurs, the installation model version management unit 820 may provide a notification for the update of the corresponding AI model to the user 410. In case of the AI model installed on the user terminal 310, it may operate in a form of a single model or be provided in a method using a separate additional trained layer (e.g., LoRA, PEFT or Fine-Tuning, etc.). Therefore, the update of the AI model occurs according to the specific characteristic. Therefore, in case of the function for managing installation information of the AI model from the perspective of the user terminal 310 and provider of the AI model store 320, the installation model version management unit 820 should be able to separately manage information additionally trained on the user terminal 310 (additionally trained by linking with the user terminal 310 or a specific service) except basic meta information of the AI model. At this time, only in the case that the user 410 wishes to share the corresponding information with the management subject, the installation model version management unit 820 may manage the information. Such installation model version management unit 820 may manage version the AI model by linking with the above described installation model version management unit 620 of AI model registration service server 330.

The model operation management unit 830 may provide a function for managing a form of operation of the AI model installed on the user terminal 310. The model operation management unit 830 may manage operation of the AI model such as operation of the AI model itself and/or linkage operation with external services of the AI model, and the like. Additionally, the model operation management unit 830 may manage change of model size and changed parameter information through data learning. In addition, the model operation management unit 830 may collect and manage performance information of a corresponding AI model in case that the AI model operates on the user terminal 310. For example, the model operation management unit 830 may identify response time delay according to operation of the AI model, resource usage of the user terminal 310 of the AI model, and the like, and provide it to the server side (the AI model store 320 and/or the AI model registration service server 330). Also, the model operation management unit 830 may suggest optimal model usage environment and the like by reporting issues of excessive resource usage or delays of a specific AI model to the user 410 or the server side. For example, the model operation management unit 830 may improve responsibility when using an AI model of the user 410 by identifying characteristics of existing operation information when operating the AI model, and dynamically setting memory requirements and the like.

Figure 9:
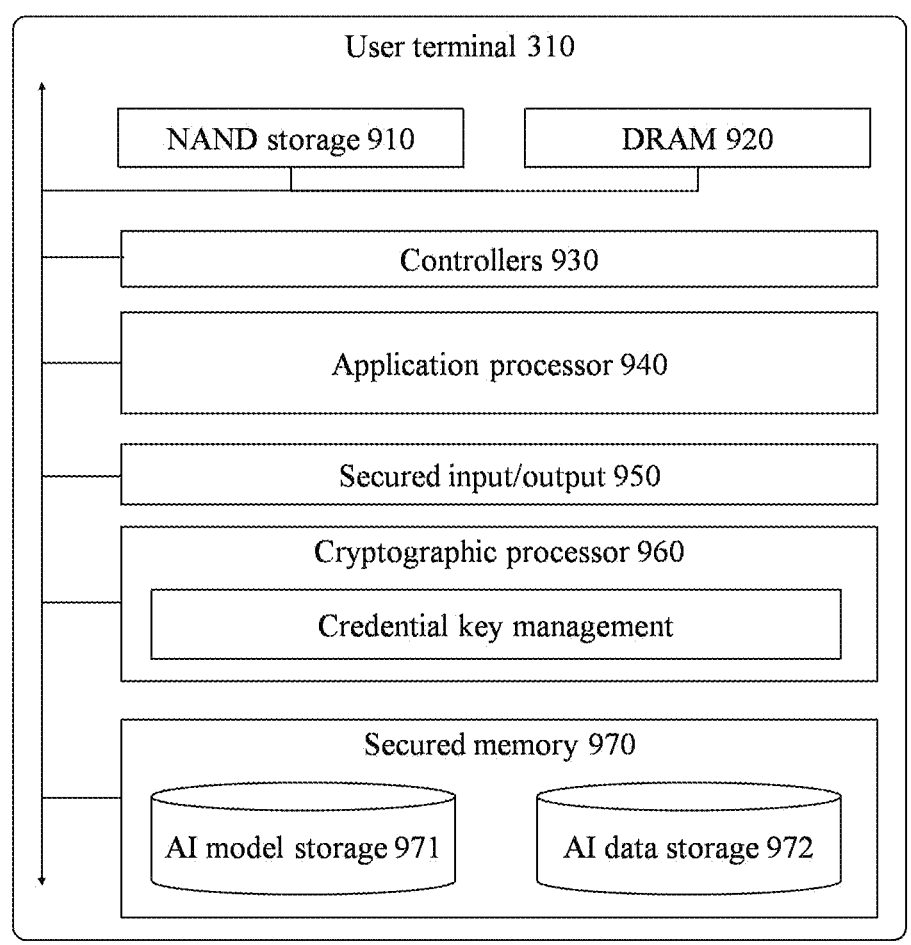
FIG. 9 is a drawing illustrating an example of a hardware structure of a user terminal for AI model operation according to an embodiment.

FIG. 9 is a drawing illustrating an example of a hardware structure of a user terminal for AI model operation according to an embodiment. The terminal 310 according to the embodiment may include a NAND (Not AND) storage 910, a DRAM (Dynamic Random Access Memory) 920, controllers 930, an application processor 940, a secured input/output 950, a cryptographic processor 960, and a secured memory 970.

The NAND storage 910 and the DRAM 920 may be storage devices that may be included in and connected with the user terminal 310.

The controllers 930 may include a bus controller connecting the storage device (the NAND storage 910 and the DRAM 920) of the user terminal 310 and external interfaces.

The application processor 940 may be a component for processing commands of the user terminal 310.

The secured input/output 950 may provide encrypted channels when communicating with the cryptographic processor 960 and the secured memory 970 to manage safely main certification information and personal information generated on the user terminal 310, and information for the AI models. At this time, as modules connectable to the encrypted channels that the secured input/output 950 provides, the cryptographic processor 960, a coprocessor, a HMAC (Hash-based Message Authentication Code) engine, a SHA (Secure Hash Algorithm) engine, a key generation module, a random-number generation module, an execution engine, volatile memory/nonvolatile memory, and the like may be included. Data to be processed in the AI model or processed data (e.g., embedded vector data) may be safely managed through the secured input/output 950.

The cryptographic processor 960 may be provided by provider of the user terminal 310 as hardware or firmware providing functions related to encryption, and may provide safety at a hardware level. Such cryptographic processor 960 may be connected with a function for Credential Key Management, and provide a function for separately managing device keys, group keys, credential keys, etc.

The secured memory 970 may include an AI model storage 971 and an AI data storage 972.

The AI model storage 971 may include AI model itself, and model storage for storing metadata related to AI model. Such model storage may separately store and manage hyperparameters with changed weights. Also, the AI model storage 971 may include a model log storage for storing operation and usage history of AI model. Data stored in such AI model storage 971 may be used to provide a function for verifying malfunctions and abnormalities of the AI model in the future.

The AI data storage 972 may store data collected and generated through AI model among user data. In case that new data is generated through use of a specific AI model, such as automatic responses or data summaries, the corresponding data may be reused to improve future performance of the AI model and unity of user experiences. Data generated as a result of the AI model execution may be separately stored through the AI data storage 972, and may be accessed by generative AI models. Data stored in the AI data storage 972 may be accessed by selection of the user 410, and the AI data storage 972 may be implemented in a way that even the AI model provider (the AI model service provider 340) cannot directly access the data externally. Also, the AI data storage 972 may include a vector storage function that may store embedded vectors, and may include a function that may store and provide information required in operation of the AI model in a vector form.

Figure 10:
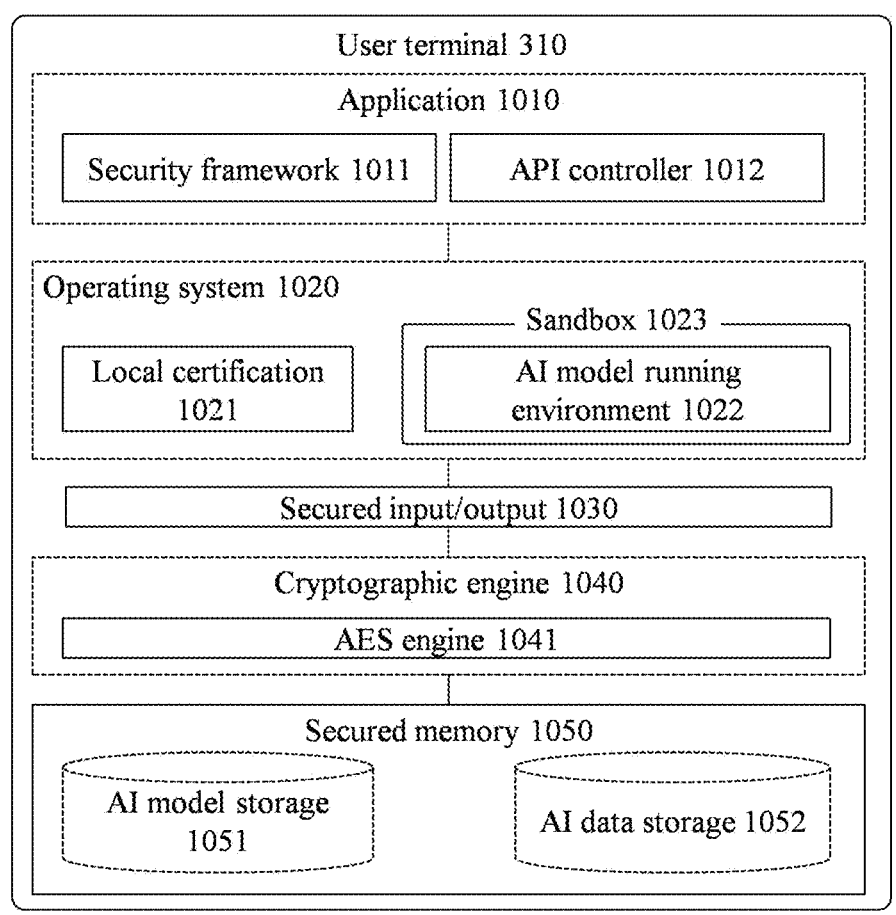
FIG. 10 is a drawing illustrating an example of a software structure of a user terminal for AI model operation according to an embodiment.

FIG. 10 is a drawing illustrating an example of a software structure of a user terminal for AI model operation according to an embodiment. The terminal 310 according to the embodiment may include an application 1010, an operating system 1020, a secured input/output 1030, a cryptographic engine 1040, and a secured memory 1050.

The application 1010 may mean applications that are authenticated, and installed and run on the user terminal 310. Such application 1010 may communicate with AI models by using security framework 1011. For example, each of AI agent applications and applications connectable thereto may interact with AI agent by using separate security framework 1011. In other words, unlike traditional applications, the AI agent may operate in a self-triggering form, so to control this, the application 1010 may have constraints of separate security framework 1011.

Also, the application 1010 may include an API controller 1012. In operation of an on-device AI model, when mutual communication is performed between the application 1010 installed on the user terminal 310 and the AI agent, the AI agent may provide an API function that may connect individual application 1010. Since the corresponding API is called and responded by the AI agent, it should be able to pre- and post-determine whether the user 410 is aware of, authorize, and safe for individual operation. The application 1010 may provide a function for managing and controlling API information that can be utilized by the AI agent through the API controller 1012.

The operating system 1020 may provide a local authentication 1012 function that can independently process user authentication, application authentication, and the like of the user terminal 310. In addition, an AI model running environment 1021 for operation of AI model may be provided in sandbox 1022 structure to provide stability and independent performance with existing functions. The AI model running environment 1021 may be used to manage priority, operating time, response waiting time, etc. of AI models to be loaded according to resource status of the user terminal 310, as a separate management environment in which AI models may safely operate. Also, the operating system 1020 may further provide functions for access management and capacity management for separate AI model storage 1051 and AI data storage 1052 that the corresponding AI model uses through the AI model running environment 1021.

The secured input/output 1030 may correspond to the above described secured input/output 950 of FIG. 9, and provide encrypted channels.

The cryptographic engine 1040 may be an engine using a separate hardware processor or implemented in software for encryption related process within the user terminal 310. To provide robust security, a hardware based encryption processing function may be provided in the user terminal 310 itself through the cryptographic engine 1040. It may provide and accelerate the encryption process by loading various encryption modules such as AES (Advanced Encryption Standard) engine 1041 and the like on its own.

The secured memory 1050 may correspond to the above described secured memory 970 of FIG. 9. The secured memory 1050 may mean space in which main and/or sensitive information related to operation of AI model is stored and managed unlike storages such as the existing general NAND flash, DRAM, etc. (e.g., the NAND storage 910 and the DRAM 920 of FIG. 9). Such secured memory 1050 may have a separate physical structure, or may be logically divided. However, for the use of the secured memory 1050, the encrypted channels provided by the secured input/output 1030 may be used. Due to the characteristics of AI models, which involve large-scale matrix computations, the secured memory 1050 may support high-speed bus interfaces with memory. In case of AI model storage 1051, it may have configuration in a file storage form, and in case of AI data storage 1052, it may serve as a space for temporarily storing data generated through input/output in an operation process of AI model, and may include vector database on its own.

Figure 11:
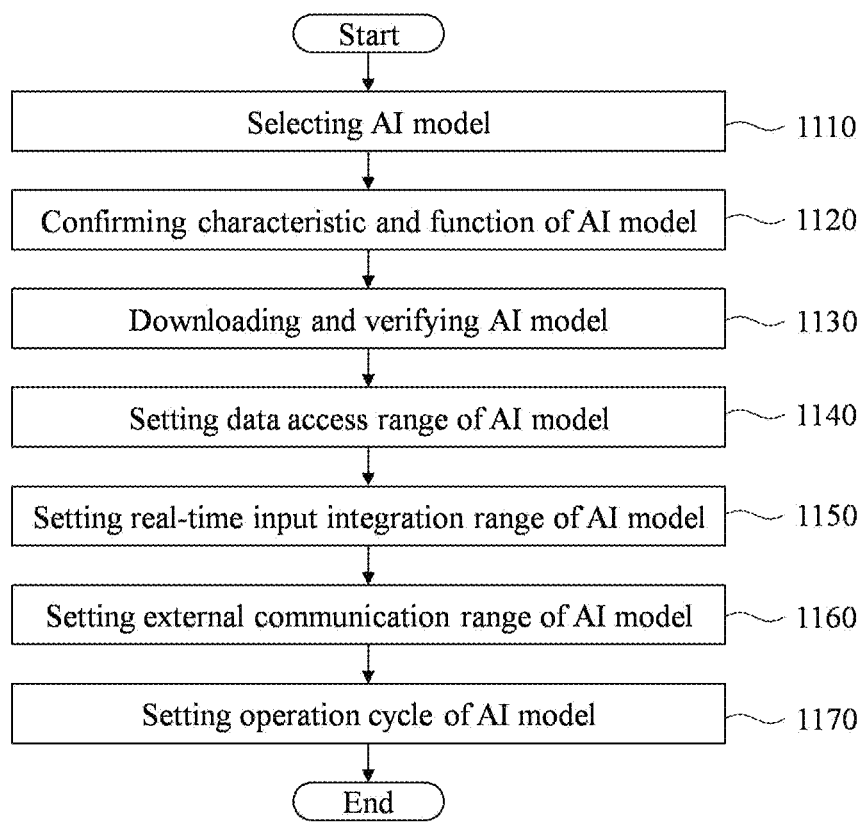
FIG. 11 is a flowchart illustrating an example of a process for downloading and installing an AI model according to an embodiment.

FIG. 11 is a flowchart illustrating an example of a process for downloading and installing an AI model according to an embodiment. Download and installation of an AI model according to the embodiment may be performed by the user terminal 310.

In Step 1110, the user terminal 310 may select an AI model. The user 410 may confirm an AI model to be installed through the AI model store 320 or service apps that the user 410 uses. For example, the user terminal 310 may select a specific artificial intelligence model among a plurality of artificial intelligence models registered in the AI model store 320. At this time, the selected artificial intelligence model may be a model selected by the user. For example, in case that there is an AI model to be installed by determination of the user 410, the user terminal 310 may select the corresponding AI model according to input of the user 410, be connected to the AI model store 320, and acquire detail information for the AI model and provide it to the user 410.

In Step 1120, the user terminal 310 may confirm characteristics and functions of the AI model. For example, the user terminal 310 may acquire information for characteristics and functions of the artificial intelligence model selected in Step 1110 through the AI model store 320, and provide it to the user 410. Like this, the user terminal 310 may acquire information of the verified AI model and provide it to the user 410 through the operating system of the user terminal 310 and services of providers managing secured data storage space, model execution storage, etc. such as the AI model store 320. In this case, the user 410 may confirm basic information required for model utilization such as sizes and characteristics of models, service linkage forms, and personal information access range, and may confirm information such as benefits that may be obtained through this, reviews of other users, costs for model installation and utilization. Also, when providing personal information of the user 410, the user terminal 310 may acquire information for expected benefits (e.g. estimation for the benefits) that may be obtained after installing the corresponding AI model through the AI model store 320, and provide it to the user 410. However, for this, user information should be verifiable in relation to providers of the corresponding AI model, certified applications or online services on the user terminal 310. Here, information for the benefits may include not only simple cost reduction forms but also interaction cases between various users and terminals such as reducing the number of interactions between the user 410 and the user terminal 310 (e.g., providing summary information, automatic ordering, etc.), effectively responding to specific services (e.g., reservations, events, etc.).

After this, the user 410 may request installation of a corresponding AI model through the user terminal 310 after confirming information of the AI model to be installed.

In Step 1130, the user terminal 310 may download and verify the AI model. In case that the user 410 request installation of a specific AI model, the user terminal 310 may download the AI model requested by the user 410 through the AI model store 320 and verify it. At this time, in case that sufficient model operation environment (storage space and computing power) is not provided on the user terminal 310, the download of the corresponding AI model is not performed, or the user terminal 310 may recommend an AI model requiring smaller size or less computing power to the user 410 through the AI model store 320. In addition, in case that too many AI models are downloaded or operated on the user terminal 310, the user terminal 310 may provide information for AI models installed on the user terminal 310 to the user 410.

When downloading AI models, in a process that the AI model is stored in storage space of secured memory 910 or 1050, a separate encryption method may be utilized. For example, the user terminal 310 may improve vulnerabilities according to external contamination of the AI model in the download process through application in a form of encrypting part or all of values of the AI model and then decrypting it by using a one-time encryption method. As more particular example, the user terminal 310 may be implemented by the computer device 200, and the processor 220 of the computer device 200 may be implemented to execute control instructions according to code of operating system or code of at least one computer program that the memory 210 includes. Here, the processor 220 may control the computer device 200 to perform Steps 1110 to 1170 that the method of FIG. 11 includes according to control instructions that code stored in the computer device 200 provides. At this time, cryptographic processor implemented as hardware or firmware providing encryption functions as the processor 220 may be further included. In this case, the computer device 200 may encrypt at least part of AI model selected through encrypted channels set between secured memories that the cryptographic processor and the computer device 200 may further include, and may transmit it to the storage space of the secured memory. The secured memory may correspond to the above described secured memory 970 or 1050. Such secured memory has been described in detail previously.

In Step 1140, the user terminal 310 may set access range of data of the AI model. For example, the user terminal 310 may provide a function that the user 410 may set access range for data of the AI model installed on the user terminal 310 to the user 410. The function for setting data access range may include a function for setting (1) the form of data that the verified AI model may access, application that the verified AI model among external applications installed on the user terminal 310 may call, and/or (3) data that the verified AI model may access among data stored on the user terminal 310. For example, the user 410 may determine access (connection) range of existing data that the corresponding AI model may access according to their model using form by using functions provided from the user terminal 310. As described above, such data access range may include not only form of data that the AI model may access (file, image, video, etc.) but also range that existing installed external applications may be called and/or range that it may access to the existing data.

In Step 1150, the user terminal 310 may set real-time input integration range of the AI model. At this time, the user terminal 310 may set range that it may integrate user commands input to the user terminal 310 in real time when operating the AI model. For example, the AI model may have call steps in the form such as 1) to 3) follows.

1) In case that the AI model is called through a user AI interface provided by the user terminal 310
2) In case that the AI model directly waits commands of the user 410 (in case of directly processing instructions input to the user terminal 310 from the user 410 through MIC (microphone), prompt, etc.)
3) In case that it may be called through another AI model or an application installed on the user terminal 310

The user terminal 310 may provide a function for setting whether to activate the form of each of the above described 1) to 3) to the user 410. In case that the AI model directly waits commands of the user 410, the user terminal 310 may provide a notification that a separate AI agent monitors user information through separate means (e.g., Indicator Light, background audio guidance, notification message via top of app, etc.) to the user 410.

In Step 1160, the user terminal 310 may set external communication range of the AI model. Whether the AI model requires external communication may be confirmed during the process that the AI model store 320 verifies the corresponding AI model. In this case, the user terminal 310 may provide the user 410 with a function for obtaining the user's consent for external communication of the corresponding AI model from the user 410 for the AI model requiring external communication. After this, depending on whether the user 410 consents to external communication of the corresponding AI model through the provided function, the user terminal 310 may set external communication range of the corresponding AI model.

In Step 1170, the user terminal 310 may set operation cycle of the AI model. The user terminal 310 may set cycle and method by which the AI model operates in response to user input. In the set method, a method that the AI model is self-triggered may be included.

When the setting for the AI model is completed on the user terminal 310, the corresponding setting information may be transmitted to the AI model registration service server 330 and stored. Also, manifest information for the setting information of the corresponding AI model is separately stored and managed on the user terminal 310, and it may be utilized in discovery of the AI model later. When the setting for the AI model is completed on the user terminal 310, for safe operation, the user terminal 310, the AI model store 320, and/or the AI model registration service server 330 record the information for the AI model installed on the corresponding user terminal 310, so that it may be utilized in monitoring whether the AI model is changed in the future. The information for the AI model may be stored in the form of, for example, snap shot, on the user terminal 310, the AI model store 320, and/or the AI model registration service server 330.

An example of general information for AI model among metadata for management of AI model is as shown in Table 1 below.

TABLE 1

Metadata
On Device Model Information//Information for management of AI model operating on user terminal
General//General Information for AI model
Name//Name of AI model (provided to user)
Code//Internal Code of AI model
Hash//Hash value of AI model
Size//Size of AI model
Latest updated//Latest update information (date)
Certification Code//Certification obtaining code
Certification Date//Certification date
Core Model//Core information of AI model, in case of AI model operating in form of fine tuning on user terminal, it means information of core model initially downloaded and installed
Version//Version information
Size//Size of core model
Hash//Hash value of core model
Local Model//In case of AI model where information of AI model is updated on user terminal according to usage of user, changes in related model values are recorded
Latest updated//Latest update information (date)
Size//Size of local AI model
Hash//Hash value of local AI model
Backup Methods// External backup of AI model(Cloud, Data Vaults, service for AI model management of Service Provider)
Backup Date//External backup date of AI model(it may be different from latest update data of local AI model)

An example of information related to external access control of AI model among metadata for management of AI model is as shown in Table 2 below.

TABLE 2

Metadata
Data Access Control Information//All control information for external information access of AI model
Channel//Channel related information
Communication//Communication information (in case that access to external or real-time data I/O is required)
URL (APIs)//URL for external communication
Local Channel//Points requiring real-time access by using input/output interface of user terminal where AI model is installed
Local data Access//Information for internal data access
Access ID//Storage access information in user terminal (rather than physical address, logical address information such as photo album, voice recording, etc. (allowing access on operating system or security framework
Access Code//Separate code for information access
Accessible data list//Accessible data list (user permitted or basically obtained when installing model of terminal)
Data type//Data type
App.//Unique application information that can be connected (installed on user terminal)
Device//Device connectable with user terminal such as Smart Watch, Smart
Ring, Smart Glass, Bluetooth Devices, etc.

TABLE 2-continued

PermissionRequest//Permission form of user
Access type
ByPass//Always accessible
Ask//Access depending on user response result
User Allowance Information
Permission Allow List
ID//Shared ID to use when accessing application or device information of user terminal
PermissionItems//User permission information
Permitted Date//Permission grant time (date)

An example of information for response performance related to operation of AI model among metadata for management of AI model is as shown in Table 3 below.

TABLE 3

Figure 12:
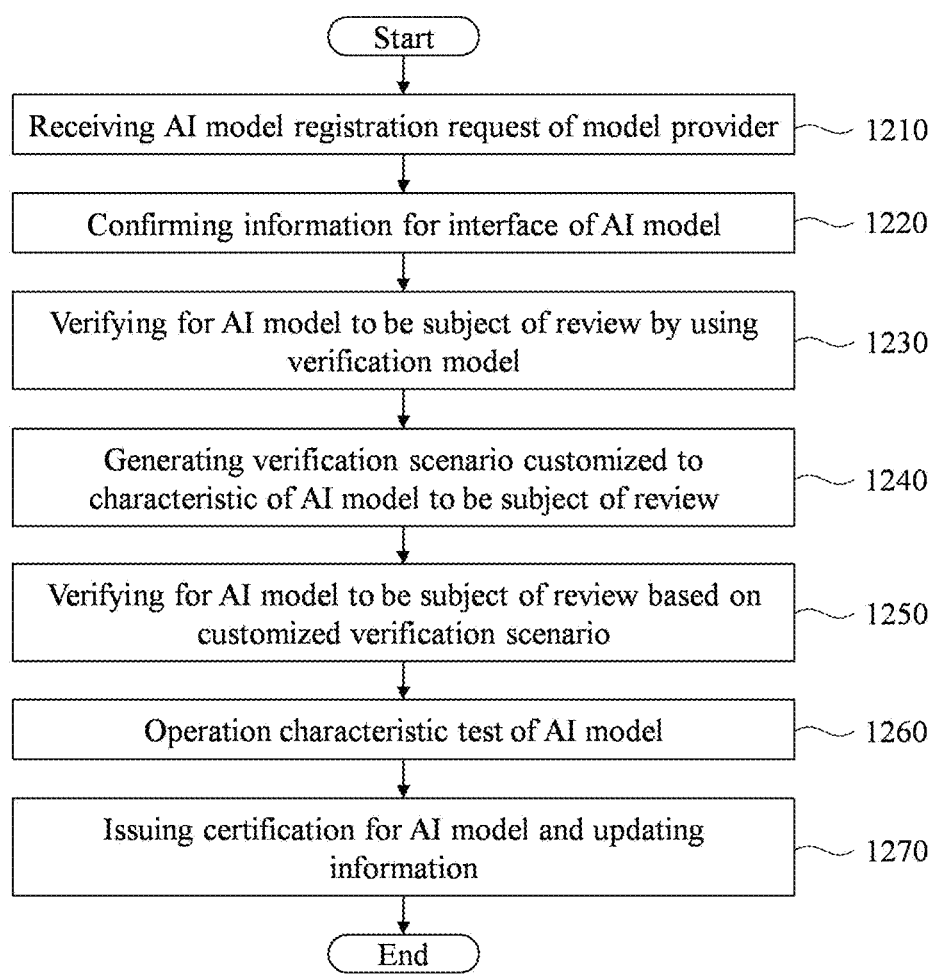
FIG. 12 is a flowchart illustrating an example of a process for verifying a model of an AI model store according to an embodiment.

Metadata
Service Performance Information//Information related to response performance of AI model
Model response time//Response time
Input token length//Input token length
Output token length//Output token length
API model response time//External model call response time
Request token length//Request token length
Response token length//Response token length
Operation Performance Information//Hardware usage information of user terminal related to operation of AI model
Processor//Process related information
Type//Processor Type {AP, NPU, GPU, TPU, Inference, etc.}
Usage//Communication information (in case that access to external or real-time data I/O is required)
Temperature//URL for external communication
Memory//Memory related information of user terminal
General Usage//Memory allocation
Dedicated Usage// Dedicated memory usage in HBM(High Bandwidth Memory) form allocated for specific processor such as NPU(Neural Processing Unit), TPU(Tensor Processing Unit), etc.
Storage//Storage related information of user terminal
Usage//Storage usage
Battery Usage//Battery usage at that point FIG. 12 is a flowchart illustrating an example of a process for verifying a model of an AI model store according to an embodiment. A process for verifying a model for an AI model according to the embodiment may be performed by the AI model store 320.

In Step 1210, the AI model store 320 may receive a registration request for an AI model of a model provider. Here, the model provider may correspond to the AI model service provider 340. A provider of an AI model may request an examination for registration of an AI model on the AI model store 320 to provide their AI model, and the AI model store 320 may receive such request.

In Step 1220, the AI model store 320 may confirm information for an interface of an AI model. The AI model store 320 may proceed with examination for the corresponding AI model based on contents that the model provider provides for interface functions that the AI model has, and for this, may confirm information for the interface of the AI model that the model provider provides. In case of an AI model operating on the user terminal 310, it should be run in a completely isolation environment due to issues such as security and privacy, and an external integration function may be provided for only specific functions with consent of the user 410.

In Step 1230, the AI model store 320 may proceed with verification for an AI model to be reviewed by using a verification model. The AI model store 320 may proceed with verification for the corresponding AI model by using a small-scale model (verification model) whose safety is verified to examine the AI model. At this time, the verification model may mean a model which has completed verification for specific fields or data areas by using data with guaranteed stability. It may be proceed in a form of verifying areas that individual AI model has rather than verifying all AI models.

In Step 1240, the AI model store 320 may generate verification scenarios customized to characteristics of an AI model which is a subject of review. For an AI model which has completed verification by the small-scale verification model and is a subject of review, scenario verification customized to characteristics of the corresponding AI model may be performed. Since the AI model may actively respond to various events due to its characteristics, in addition to basic stability verification, a verification scenario according to characteristics of the corresponding AI model is required. At this time, the AI model store 320 may generate a customized verification scenario for the corresponding AI model based on the verification scenario provided by the model provider, interface information, and weight information of AI model.

In Step 1250, the AI model store 320 may proceed with verification for an AI model which is a subject of review based on the customized verification scenario. The AI model store 320 may go through a separate test process for the AI model for the above described customized verification scenario.

In Step 1260, the AI model store 320 may test operation characteristics of an AI model. The AI model store 320 may proceed with test for characteristics when the AI model operates in a terminal environment. It may proceed with test for basic operation environment such as operation speed, computing resource usage, power, etc. of the AI model according to operation environment of AI model for each terminal, and according to the embodiment, information such as whether user data is accessible, whether external network is linked, and the like may be also be a subject of test. In addition, in case of having a characteristic requiring real-time, operability of the AI model may be determined based on capacity of the corresponding AI model (whether the AI model can operate in real-time on the user terminal 310).

In Step 1270, the AI model store 320 may issue certification for the AI model, and update information. The AI model store 320 may issue certification (a certificate) for an AI model passing the verification process. At this time, in certification information, AI model's characteristic information (AI model's size, hash value, test contents, expiration date, etc.) may be included. In case of an AI model where certification is issued (a certificate is issued), information for the certified AI model may be updated in the AI model store 320 and/or the AI model registration service server 330, and it may be operated in an environment of the user terminal 310.

In case of an AI model, it should be able to independently operate, and when the AI model operates, there is a characteristic that costs of context switching according to memory usage is high. Accordingly, the AI model which may operate in a terminal environment according to size of the AI model is limited, and particularly in case of an AI model having big size, it may be limited to operate only a single model in real-time on the terminal.

In case of a model which may be separately embedded for user data or operate in a non-real-time form, the AI model may automatically schedule operation information based on computing characteristics of the user terminal 310, and the priority may be increased by a request of an external approved service.

In addition, an AI model operating in real-time (e.g., an AI model for communication, calls, SMS/MMS/chat, etc.) should be able to be loaded always on an AI inference engine of the terminal.

Also, according to operation of the AI model, in case of LLM (Large Language Model) and the like, if separate data is embedded on its own, separate vector storage space may be required. At this time, when embedding for each AI model, since efficiency of vector storage space is reduced, use of an embedding model provided by the user terminal 310 or the provider of the AI model store 320 may be proposed to the user 410. In this case, individual AI model may vectorize data by utilizing the provided embedded model, and when utilizing data in the future, it may operate according to characteristics of the corresponding embedding model.

FIG. 13 is a flowchart illustrating an example of a method for managing an artificial intelligence model according to an embodiment. A method for managing an artificial intelligence model according to the embodiment may be performed by the computer device 200 implementing the AI model registration service server 330. At this time, the processor 220 of the computer device 200 may be implemented to execute control instructions according to code of operating system or code of at least one computer program that the memory 210 includes. Here, the processor 220 may control the computer device 200 to perform Steps 1310 to 1340 that the method of FIG. 13 includes according to control instructions that code stored in the computer device 200 provides.

In Step 1310, the computer device 200 may store and update device information of each of a plurality of user terminals downloading an artificial intelligence model from an artificial intelligence model store and installing it. Each of the plurality of user terminals may correspond to the above described user terminal 310. Also, the artificial intelligence model store may correspond to the above described AI model store 320. Here, the device information may include at least one of information for version of operating system on a user terminal, and security framework of an application calling an artificial intelligence model.

In Step 1320, the computer device 200 may further store and update information for a range of device integration of an artificial intelligence model registered in the artificial intelligence model store. Here, the information for the range of device integration may include at least one of information for a sensor that an artificial intelligence model may integrate among pre-defined sensors, size of memory or storage space that an artificial intelligence model may use, update cycle of an artificial intelligence model.

In Step 1330, according to an installation request for a first artificial intelligence model of a first user terminal among the plurality of user terminals, the computer device 200 may determine whether the first artificial intelligence model may be installed on the first user terminal based on device information of the first user terminal.

In Step 1340, the computer device 200 may define a range of functions that a second artificial intelligence model is accessible on a second user terminal by using hardware information of the second user terminal among the plurality of user terminals and a range of device integration of the second artificial intelligence model. Here, the second user terminal may be the same with or different from the first user terminal. The range of functions may include information for applications that an artificial intelligence model is accessible on the second user terminal, information for accessible sensors, and/or information for accessible data.

In Step 1350, the computer device 200 may determine a third artificial intelligence model from which at least one function among functions included in the second artificial intelligence model is excluded according to the range of functions. Here, the second artificial intelligence model may include an artificial intelligence model requesting installation on the second user terminal. In this case, the third artificial intelligence model may be recommended to the second user terminal instead of the second artificial intelligence model. Previously, it was described that if a specific AI model has N functions and the user terminal 310 has N−1 functions, the AI model registration service server 330 may reduce operation space of the model on the user terminal 310 by providing a service to the user terminal 310 to select and download another AI model excluding a function that cannot be performed on the user terminal 310 through information managed by the user terminal information management unit 610. It may be easily understood that if there are two or more functions that the user terminal 310 cannot perform through the corresponding AI model, another AI model excluding two or more functions may be selected.

According to embodiments, the computer device 200 may manage update schedule for an artificial intelligence model installed on each of a plurality of user terminals by using information for a range of device integration. For example, the computer device 200 may manage update schedule for an artificial intelligence model installed on each of the plurality of user terminals by utilizing update cycle of the artificial intelligence model on each user terminal that the information for a range of device integration includes.

In addition, according to embodiments, it may further store and update version information of an artificial intelligence model installed on each of the plurality of user terminals. For example, if the computer device 200 confirms that version of a specific artificial intelligence model is updated, it may provide a notification for version update of the corresponding artificial intelligence model to user terminals on which the corresponding artificial intelligence model is installed.

Also, according to embodiments, the computer device 200 may further store and update operation information of an artificial intelligence model installed and run on each of the plurality of user terminals. Here, the operation information may include at least one of information for whether the artificial intelligence model installed and run on the user terminal communicates with external services of the user terminal, and information for whether the artificial intelligence model installed and run on the user terminal is updated itself on the corresponding user terminal. For example, the artificial intelligence model updated itself on the user terminal needs to be managed as a different version of an artificial intelligence model from an artificial intelligence model registered in the corresponding artificial intelligence model store. The computer device 200 may additionally manage version of an artificial intelligence model through such information for whether it is updated itself.

Like this, according to the embodiments of the present disclosure, a method and system for management of an artificial intelligence model installed and operated on a terminal environment may be provided.

The aforementioned system and device may be implemented as a hardware component, a software component, and/or a combination of a hardware component and a software component. For example, the device and component described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, a component, a physical device, virtual equipment, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means and stored in a computer-readable medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include an app store in which apps are distributed, a site in which various pieces of other software are supplied or distributed, and recording media and/or storage media managed in a server. Examples of program instructions include both machine code, such as produced by a compiler, and higher level code that may be executed by the computer using an interpreter.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

What is claimed is:

1. A method for managing an artificial intelligence model of a computer device comprising at least one processor, comprising:
   storing and updating device information of each of a plurality of user terminals that download and install an artificial intelligence model from an artificial intelligence model store, by the at least one processor; and
   determining whether or not a first artificial intelligence model can be installed on a first user terminal based on device information of a first user terminal according to an installation request for the first artificial intelligence model of the first user terminal among the plurality of user terminals, by the at least one processor;
   wherein a user terminal comprises an encryption processor implemented as hardware or firmware that provides an encryption function,
   the downloading and installation encrypts at least part of the artificial intelligence model through an encrypted channel set between the encryption processor and secured memory further included in the user terminal, and transmits it to storage space of the secured memory,
   wherein the secured memory includes artificial intelligence model storage for storing the artificial intelligence model and metadata related to the artificial intelligence model, and artificial intelligence data storage for storing data collected and generated through the artificial intelligence model installed on the user terminal, and
   the artificial intelligence data storage comprises a vector storing function for storing vector data embedded through the artificial intelligence model.

2. The method for managing an artificial intelligence model of claim 1, wherein the device information comprises at least one of operating system version information on a user terminal, and security framework of an application that calls an artificial intelligence model.

3. The method for managing an artificial intelligence model of claim 1, wherein the device information further comprises hardware information of a user terminal, and the method further comprises:
   further storing and updating information for a range of device integration of an artificial intelligence model registered in the artificial intelligence model store, by the at least one processor; and
   setting a range of functions accessible to a second user terminal by a second artificial intelligence model by using hardware information of the second user terminal among the plurality of user terminals and a range of device integration of the second artificial intelligence model, by the at least one processor.

4. The method for managing an artificial intelligence model of claim 3, further comprising:
   determining a third artificial intelligence model from which at least one function among functions included in the second artificial intelligence model is excluded according to the range of functions, by the at least one processor.

5. The method for managing an artificial intelligence model of claim 4, wherein the second artificial intelligence model comprises an artificial intelligence model requested to be installed on the second user terminal, and the third artificial intelligence model is recommended to the second user terminal instead of the second artificial intelligence model.

6. The method for managing an artificial intelligence model of claim 3, wherein information for the range of device integration comprises at least one of information on sensors that the artificial intelligence model can integrate with among predefined sensors, size of memory or storage space available to the artificial intelligence model, and update cycle of the artificial intelligence model.

7. The method for managing an artificial intelligence model of claim 3, further comprising:
managing an update schedule for an artificial intelligence model installed on each of the plurality of user terminals by using the information for the range of device integration, by the at least one processor.

8. The method for managing an artificial intelligence model of claim 1, further comprising:
further storing and updating version information of the artificial intelligence model installed on each of the plurality of user terminals, by the at least one processor.

9. The method for managing an artificial intelligence model of claim 1, further comprising:
further storing and updating operation information of the artificial intelligence model installed and run on each of the plurality of user terminals, by the at least one processor.

10. The method for managing an artificial intelligence model of claim 9, wherein the operation information comprises at least one of information on whether the artificial intelligence model installed and run on each of the plurality of user terminals communicated with external services of the user terminals, and information on whether the artificial intelligence model installed and run on each of the plurality of user terminals was updated itself on the corresponding user terminal.

11. A method for managing an artificial intelligence model of a computer device comprising at least one processor, comprising:
selecting an artificial intelligence model among a plurality of artificial intelligence models registered in an artificial intelligence model store, by the at least one processor;
acquiring information for features and functions of the selected artificial intelligence model through the artificial intelligence model store and providing it to a user, by the at least one processor;
downloading and verifying the selected artificial intelligence model through the artificial intelligence model store according to the user's request, by the at least one processor; and
providing a function for setting at least two or more of a data access range, a real-time input integration range, an external communication range, and operation cycle of the verified artificial intelligence model through the user, by the at least one processor;
wherein the at least one processor comprises an encryption processor implemented as hardware or firmware that provides an encryption function,
the downloading and verifying encrypts at least part of the selected artificial intelligence model through an encrypted channel set between the encryption processor and secured memory further included in the computer device, and transmits it to storage space of the secured memory,
wherein the secured memory includes artificial intelligence model storage for storing an artificial intelligence model and metadata related to an artificial intelligence model, and artificial intelligence data storage for storing data collected and generated through an artificial intelligence model installed on the computer device, and
the artificial intelligence data storage comprises a vector storing function for storing vector data embedded through an artificial intelligence model.

12. The method for managing an artificial intelligence model of claim 11, wherein the function for setting the data access range comprises a function for setting at least one of (1) format of data accessible by the verified artificial intelligence model, (2) an application that can be called by the verified artificial intelligence model among external applications installed on the computer device, and (3) data accessible by the artificial intelligence model among data stored on the computer device.

13. The method for managing an artificial intelligence model of claim 11, wherein the function for setting the real-time input integration range comprises a function for setting a callable form that can be activated in relation to the verified artificial intelligence model among a plurality of preset callable forms.

14. The method for managing an artificial intelligence model of claim 13, wherein the plurality of callable forms comprise two or more of (1) a form in which the verified artificial intelligence model is called through a user interface provided by the computer device, (2) a form in which the verified artificial intelligence model waits for the user's command, and (3) a form in which the verified artificial intelligence model is called through another artificial intelligence model or an application installed on the computer device.

15. The method for managing an artificial intelligence model of claim 11, wherein the function for setting the external communication range comprises a function for setting whether the verified artificial intelligence model can communicate externally.

16. The method for managing an artificial intelligence model of claim 11, wherein the function for setting the operation cycle comprises a function for setting a cycle or method in which the verified artificial intelligence model operates in response to the user's input.

17. The method for managing an artificial intelligence model of claim 16, wherein the method in which the verified artificial intelligence model operates in response to the user's input comprises at least a method in which the verified artificial intelligence model is triggered itself.

18. A computer device, comprising at least one processor implemented to execute instructions readable on the computer device,
wherein the computer device, by the at least one processor, stores and updates device information of each of a plurality of user terminals that download and install an artificial intelligence model from an artificial intelligence model store, and determines whether or not a first artificial intelligence model can be installed on a first user terminal based on device information of the first user terminal according to an installation request for the first artificial intelligence model of the first user terminal among the plurality of user terminals,
wherein a user terminal comprises an encryption processor implemented as hardware or firmware that provides an encryption function,
the downloading and installation encrypts at least part of the artificial intelligence model through an encrypted channel set between the encryption processor and secured memory further included in the user terminal, and transmits it to storage space of the secured memory, wherein the secured memory includes artificial intelligence model storage for storing the artificial intelligence model and metadata related to the artificial intelligence model, and artificial intelligence data storage for storing data collected and generated through the artificial intelligence model installed on the user terminal, and the artificial intelligence data storage comprises a vector storing function for storing vector data embedded through the artificial intelligence model.

19. The computer device of claim 18, wherein the device information further comprises hardware information of a user terminal, the computer device, by the at least one processor, further stores and updates information for a range of device integration of an artificial intelligence model registered in the artificial intelligence model store, and the computer device, by the at least one processor, further sets a range of functions accessible to a second user terminal by a second artificial intelligence model by using hardware information of the second user terminal among the plurality of user terminals and a range of device integration of the second artificial intelligence model.

20. The computer device of claim 18, wherein the computer device, by the at least one processor, further stores and updates operation information of the artificial intelligence model installed and run on each of the plurality of user terminals.

* * * * *